(12) United States Patent
Noumi et al.

(10) Patent No.: US 9,546,253 B2
(45) Date of Patent: Jan. 17, 2017

(54) POLYOLEFIN POROUS FILM, METHOD FOR PRODUCING THE SAME AND APPARATUS FOR PRODUCING THE SAME

(75) Inventors: Shunsuke Noumi, Osaka (JP); Kouji Tadokoro, Osaka (JP); Yoshihiko Kondou, Osaka (JP); Masatoshi Kawamura, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 142 days.

(21) Appl. No.: 13/075,519

(22) Filed: Mar. 30, 2011

(65) Prior Publication Data

US 2012/0035285 A1 Feb. 9, 2012

(30) Foreign Application Priority Data

Aug. 5, 2010 (JP) ................................ 2010-176807
Dec. 28, 2010 (JP) ................................ 2010-293506

(51) Int. Cl.
| | | |
|---|---|---|
| C08J 9/35 | (2006.01) | |
| C08J 5/18 | (2006.01) | |
| B29C 55/14 | (2006.01) | |
| B29K 23/00 | (2006.01) | |
| B29K 105/04 | (2006.01) | |

(52) U.S. Cl.
CPC ............... *C08J 5/18* (2013.01); *B29C 55/143* (2013.01); *B29K 2023/0683* (2013.01); *B29K 2105/04* (2013.01); *C08J 2323/06* (2013.01)

(58) Field of Classification Search
CPC ........ B29C 55/143; C08J 5/18; C08J 2323/06; C08J 2201/04; B29K 2023/0683; B29K 2105/04
USPC ............... 521/61, 63, 143; 264/42, 344, 345
See application file for complete search history.

(56) References Cited

U.S. PATENT DOCUMENTS

| 4,873,034 A * | 10/1989 | Kono et al. ..................... 264/41 |
|---|---|---|
| 2010/0144224 A1* | 6/2010 | De Weijer et al. ................ 442/1 |
| 2012/0035285 A1 | 2/2012 | Noumi et al. |

FOREIGN PATENT DOCUMENTS

| CN | 101345296 A | 1/2009 |
|---|---|---|
| CN | 201369354 Y | 12/2009 |
| CN | 102439760 A | 5/2012 |
| CN | 202265532 U | 6/2012 |
| JP | 2001-172420 A | 6/2001 |
| JP | 2001-192487 A | 7/2001 |
| JP | 2003-103624 A | 4/2003 |
| JP | 2003-103626 A | 4/2003 |
| JP | 2003-105121 A | 4/2003 |
| JP | 2003-105122 A | 4/2003 |
| JP | 2006-124652 A | 5/2006 |
| WO | 2010/128370 A1 | 11/2010 |

OTHER PUBLICATIONS

Communication from the State Intellectual Property Office of P.R. China dated Jun. 30, 2011, in counterpart Chinese Application No. 201020699897.9.
Office Action dated Oct. 13, 2011, issued by the State Intellectual Property Office of P.R. China in counterpart Chinese Application No. 201020699897.9.
Communication dated Jan. 20, 2014 from the State Intellectual Property Office of P.R. China in a counterpart application No. 201010623061.5.
Office Action, dated Dec. 10, 2013, issued by the Japanese Patent Office, in counterpart Application No. 2010-293506.
Office Action issued Aug. 8, 2014 by the State Intellectual Property Office of P.R. China in corresponding Application No. 201010623061.5.
Office Action dated Apr. 20, 2015 issued by the State Intellectual Property Office of the PR of China in corresponding Application No. 201010623061.5.

* cited by examiner

*Primary Examiner* — Irina S Zemel
(74) *Attorney, Agent, or Firm* — Sughrue Mion, PLLC

(57) ABSTRACT

The present invention relates to a method for producing a polyolefin porous film, the method including the steps of: (a) melt-kneading a solution containing a polyolefin having a weight average molecular weight of 500,000 or more and a solvent to obtain a kneaded product; (b) extruding and cooling the kneaded product to obtain a gel-like molded product; (c) drawing the gel-like molded product to obtain a drawn sheet; (d) removing the solvent from the drawn sheet, followed by drying to obtain a film in which fine pores are formed; (e) conducting heat treatment, while fixing the film in both directions of a MD and a TD thereof and drawing the film at a draw ratio of exceeding 0% to less than 0.1% in at least one direction of the MD and the TD thereof; and (f) conducting heat treatment while decreasing a width of the film in at least one direction of the MD and the TD of the film.

3 Claims, 1 Drawing Sheet

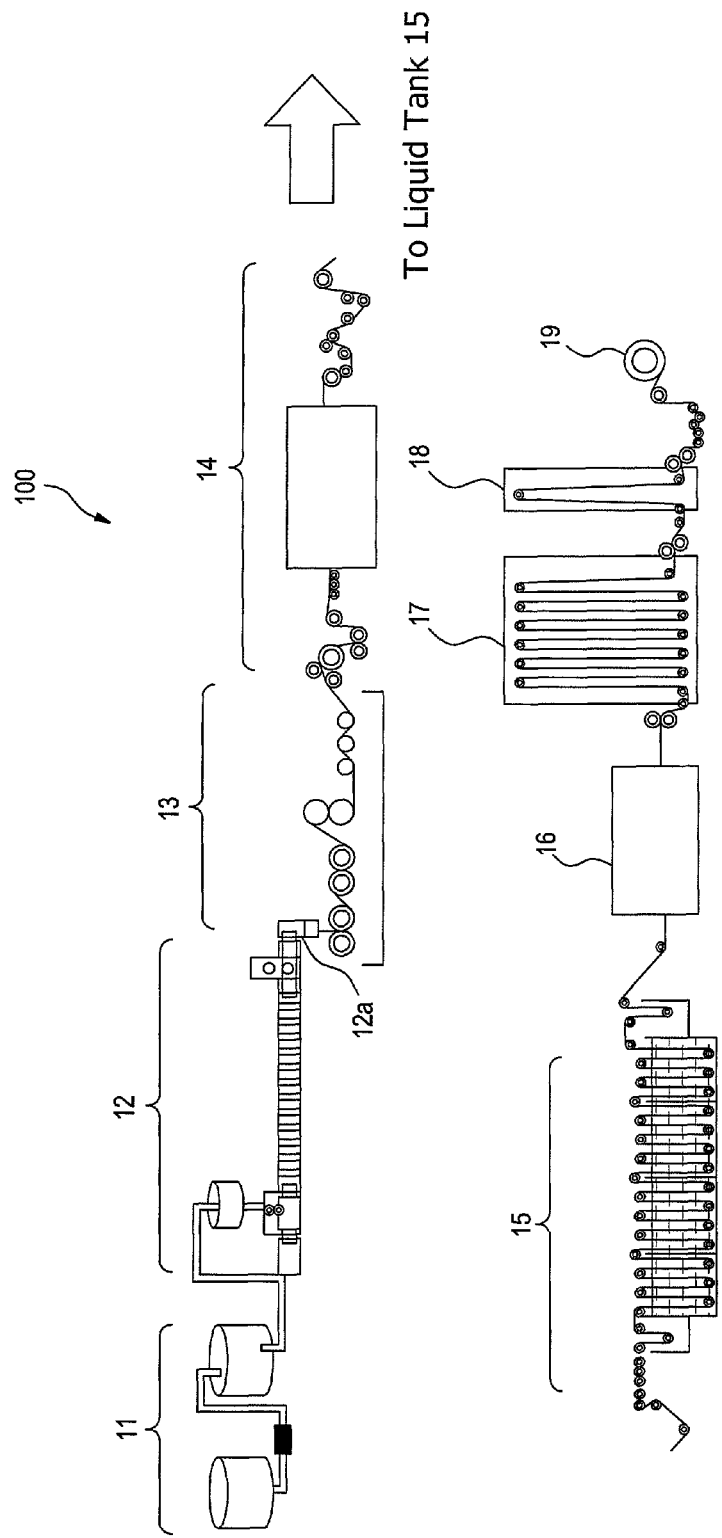

POLYOLEFIN POROUS FILM, METHOD FOR PRODUCING THE SAME AND APPARATUS FOR PRODUCING THE SAME

FIELD OF THE INVENTION

The present invention relates to a polyolefin porous film and particularly relates to a polyolefin porous film suitable for a lithium battery separator, a method for producing the same and an apparatus for producing the same.

BACKGROUND OF THE INVENTION

Polyolefin porous films have been used in battery separators, electrolytic capacitors and the like. In particular, they have been used as separators insoluble in organic solvents and stable to electrolytes or electrode active materials in lithium batteries. Recently, it has been demanded for lithium battery separators to improve battery characteristics, safety and productivity. In particular, it is very important to balance the battery characteristics and the safety at high levels. In order to improve the battery characteristics, it has been required to optimize the pore size, porosity, ion permeability and the like of the battery separators used in various battery systems. Further, in terms of the safety, importance is attached to improvement of film strength and a decrease in thermal shrinkage ratio, in order to prevent the occurrence of accidents such as ignition at the time when electrodes are short-circuited to rise the temperature of the insides of the batteries. From these, various proposals have been made in order to decrease the thermal shrinkage ratio while maintaining the balance of the pore size, the porosity, the ion permeability and the film strength.

For example, there is proposed a method for producing a polyolefin porous film including melt-kneading a solution composed of an ultrahigh molecular weight polyolefin having a weight average molecular weight of 500,000 or more, high-density polyethylene having a weight average molecular weight of 10,000 to less than 500,000 and a solvent, followed by extruding and cooling, drawing the resulting gel-like molded product, removing the solvent from the resulting drawn product, and performing a heat set process after drying (JP-A-2001-172420 and JP-A-2001-192487), and an example of use as the lithium battery separator is also mentioned.

Patent Document 1: JP-A-2001-172420
Patent Document 2: JP-A-2001-192487

SUMMARY OF THE INVENTION

The invention has been made in view of the above-mentioned situations, and an object thereof is to provide a polyolefin porous film in which the balance of the above-mentioned physical properties is maintained or improved and the thermal shrinkage ratio is decreased, a method for producing the same and an apparatus for producing the same.

Namely, the present invention relates to the following items (1) to (8).

(1) A method for producing a polyolefin porous film, the method including the steps of:
(a) melt-kneading a solution containing a polyolefin having a weight average molecular weight of 500,000 or more and a solvent to obtain a kneaded product;
(b) extruding and cooling the kneaded product to obtain a gel-like molded product;
(c) drawing the gel-like molded product to obtain a drawn sheet;
(d) removing the solvent from the drawn sheet, followed by drying to obtain a film in which fine pores are formed;
(e) conducting heat treatment, while fixing the film in both directions of a MD and a TD thereof and drawing the film at a draw ratio of exceeding 0% to less than 0.1% in at least one direction of the MD and the TD thereof; and
(f) conducting heat treatment while decreasing a width of the film in at least one direction of the MD and the TD of the film.

(2) The method for producing a polyolefin porous film according to (1), in which the polyolefin having a weight average molecular weight of 500,000 or more includes ultrahigh molecular weight polyethylene having a weight average molecular weight of 500,000 or more.

(3) The method for producing a polyolefin porous film according to (2), in which the solution substantially consists of ultrahigh molecular weight polyethylene having a weight average molecular weight of 500,000 or more and the solvent.

(4) The method for producing a polyolefin porous film according to (1) or (2), in which a polymer-type hindered phenol-based antioxidant is added to the solvent in the step (a).

(5) An apparatus for producing a polyolefin porous film, the apparatus including:
a melting section which melts a solution containing a polyolefin having a weight average molecular weight of 500,000 or more and a solvent;
a kneading section which is connected to the melting section and kneads the solution melted in the melting section to obtain a kneaded product;
a cool-molding section which is connected to the kneading section and cools the kneaded product obtained in the kneading section to obtain a gel-like molded product;
a drawing section which is connected to the cool-molding section and draws the gel-like molded product to obtain a drawn sheet;
a solvent-removing section which is connected to the drawing section and removes the solvent from the drawn sheet to obtain a film;
a first heat treatment section which is connected directly or indirectly to the solvent-removing section and conducts heat treatment, while fixing the film in both directions of a MD and a TD of the film from which the solvent is removed and in which fine pores are formed and drawing the film at a draw ratio of exceeding 0% to less than 0.1% in at least one direction of the MD and the TD thereof; and
a second heat treatment section which is connected to the first heat treatment section and conducts heat treatment while decreasing a width of the film in at least one direction of the MD and the TD of the film.

(6) The apparatus for producing a polyolefin porous film according to (5), the apparatus further including a drying section which is connected between the solvent-removing section and the first heat treatment section and dries the drawn sheet after removing the solvent therefrom.

(7) A polyolefin porous film including a polyolefin having a weight average molecular weight of 500,000 or more, which has an air permeability of 280 sec/100 cc·20 μm or less and a thermal shrinkage ratio in both directions of a MD and a TD of 4% or less.

(8) The polyolefin porous film according to (7), which substantially consists of ultrahigh molecular weight polyethylene having a weight average molecular weight of 500,000 or more.

According to the invention, there can be provided the polyolefin porous film having high air permeability and decreased thermal shrinkage ratio in both directions of a MD and a TD.

BRIEF DESCRIPTION OF THE DRAWING

FIG. 1 is a schematic view showing an apparatus for producing a polyolefin porous film.

DETAILED DESCRIPTION OF THE INVENTION

Mode for carrying out the invention will be specifically described below.

In the production of the polyolefin porous film of the invention, a polyolefin having a weight average molecular weight of 500,000 or more (hereinafter referred to as an ultrahigh molecular weight polyolefin) is used. As the ultrahigh molecular weight polyolefin, an ultrahigh molecular weight polyolefin having a weight average molecular weight of 700,000 to 1,300,000 is preferably used. When the weight average molecular weight is less than 500,000, breakage is liable to occur at the time of drawing. Accordingly, it is liable to become difficult to stably obtain the porous film having a few defects. Further, melt extrusion becomes easy by adjusting the weight average molecular weight to 5,000,000 or less, although the upper limit thereof is not limited.

Although the kind of ultrahigh molecular weight polyolefin is not particularly limited, ultrahigh molecular weight polyethylene is preferably used from easy availability thereof and the like. It may be not only a homopolymer of ethylene, but also a copolymer containing a small amount of another α-olefin. As the α-olefins other than ethylene, there are suitably used propylene, butene, hexene and the like.

Further, a polyolefin having a weight average molecular weight of 10,000 to less than 500,000 may be mixed with the ultrahigh molecular weight polyolefin. Examples of the polyolefin having a weight average molecular weight of 10,000 to less than 500,000 include polyethylene. As the kind of polyethylene, there are high-density polyethylene, low-density polyethylene, medium-density polyethylene and the like. These may be not only a homopolymer of ethylene, but also a copolymer containing a small amount of another α-olefin. As the α-olefins other than ethylene, there are suitably used propylene, butene, hexene and the like. These polyolefins having a weight average molecular weight of 10,000 to less than 500,000 may be used either alone or as a mixture of two or more thereof. Incidentally, when the polyolefin having a weight average molecular weight of 10,000 to less than 500,000 is mixed, too high the mixing ratio thereof sometimes results in a decrease in air permeability relating to permeability of lithium ions, in the case where the porous film is used a separator of a lithium battery or the like. It is therefore preferred that the amount of the polyolefin having a weight average molecular weight of 10,000 to less than 500,000 is adjusted within the range of 0 to 25 parts by weight based on 100 parts by weight of the ultrahigh molecular weight polyolefin. In particular, when a battery separator is produced in which importance is attached to air permeability rather than strength, it is preferred that the polyolefin having a weight average molecular weight of 10,000 to less than 500,000 is not mixed.

Furthermore, various additives such as an ultraviolet absorber, an antiblocking agent, a pigment, a dye and an inorganic filler may be added within the range not impairing the object of the invention, as needed.

The production method of the polyolefin porous film according to the invention will be described below in details. Incidentally, this production method can be performed by an apparatus 100 of FIG. 1 for producing the polyolefin porous film, as described later.

The polyolefin porous film of the invention is obtained by going through a step (a) of melt-kneading a solution containing an ultrahigh molecular weight polyolefin and a solvent to obtain a kneaded product; a step (b) of extruding and cooling the above-mentioned kneaded product to obtain a gel-like molded product; a step (c) of drawing the above-mentioned gel-like molded product to obtain a drawn sheet; a step (d) of removing the solvent from the above-mentioned drawn sheet, followed by drying to obtain a film in which fine pores are formed; a step (e) of conducting heat treatment, while fixing the above-mentioned film in both directions of a MD (machine direction; longitudinal direction) and a TD (transverse direction; lateral direction) thereof and drawing the above-mentioned film at a draw ratio of exceeding 0% to less than 0.1% in at least one direction of the MD and the TD thereof; and a step (f) of conducting heat treatment while decreasing the width of the above-mentioned film in at least one direction of the MD and the TD of the above-mentioned film. The above-mentioned respective steps will be described below.

In the step (a) of the production method of the polyolefin porous film according to the invention, the solution of the ultrahigh molecular weight polyolefin used as a raw material is prepared by dissolving the ultrahigh molecular weight polyolefin described above in the solvent by heating. This solvent is not particularly limited, as long as it can sufficiently dissolve the ultrahigh molecular weight polyolefin. Examples thereof include aliphatic or cyclic hydrocarbons such as nonane, decane, undecane, dodecane, decalin and liquid paraffin, mineral oil fractions having a boiling point corresponding to that of the aliphatic or cyclic hydrocarbons, and the like. In particular, a non-volatile solvent such as liquid paraffin is preferred for obtaining the gel-like molded product which is stable in solvent content. As the liquid paraffin, there is suitably used one having a kinematic viscosity at 40° C. within the range of 25 to 70 $mm^2/s$. The ultrahigh molecular weight polyolefin is dissolved in the solvent by heating by a method of performing stirring at a temperature at which the ultrahigh molecular weight polyolefin is completely dissolved or performing homogeneous mixing in an extruder. When the ultrahigh molecular weight polyolefin is dissolved while stirring in the extruder or the solvent, the temperature varies depending on the polymer and solvent used. However, the temperature is preferably, for example, within the range of 140 to 250° C. When the porous film is produced from a highly-concentrated solution of the ultrahigh molecular weight polyolefin, it is preferred to perform the dissolution in a twin-screw extruder in which dissolution and kneading are possible.

Methods for charging the extruder with the raw materials include (1) a method of supplying and melting the ultrahigh molecular weight polyolefin, and supplying the solvent from halfway of the extruder by using a side feed, (2) a method of preparing a stirring vessel, dispersing the ultrahigh molecular weight polyolefin in the solvent by stirring at a temperature of less than the dissolution temperature to prepare a homogeneous slurry, and supplying the slurry to the extruder, and (3) a method of adding the solvent by a side feed. In particular, the method (2) of supplying to the extruder the slurry obtained by stirring the ultrahigh molecular weight polyolefin and the solvent in the stirring vessel is particularly preferred, because shear energy given to the resin is decreased, load for rotating an axis of the extruder can be reduced, and deterioration of the resin can also be reduced. Although the kneading temperature varies depending on the kind of ultrahigh molecular weight polyolefin used, it is preferably from the melting point of the ultrahigh molecular weight polyolefin +20° C. to +100° C. (incidentally, in this specification, the melting point means a value measured by DSC based on JIS K 7121). For example, in the case of the ultrahigh molecular weight polyolefin, the kneading temperature is preferably from 160° C. to 230° C., and particularly from 170° C. to 210° C.

For the compounding ratio of the ultrahigh molecular weight polyolefin and the solvent, the ultrahigh molecular weight polyolefin is from 10 to 50% by weight and preferably from 10 to 30% by weight, and the solvent is from 90% to 50% by weight and preferably from 90 to 70% by weight, taking the total of the ultrahigh molecular weight polyolefin and the solvent as 100% by weight. When the ultrahigh molecular weight polyolefin is less than 10% by weight (i.e., the solvent exceeds 90% by weight), swelling or neck-in becomes large at an exit of a die in the case where it is molded into a sheet form, resulting in the difficulty of sheet formation and self supporting. On the other hand, when the ultrahigh molecular weight polyolefin exceeds 50% by weight (i.e., the solvent is less than 50% by weight), molding processability is deteriorated.

Incidentally, in order to prevent oxidation of the ultrahigh molecular weight polyolefin in the dissolution by heating for the purpose of producing the polyolefin porous film with stable quality, it is preferred to add an antioxidant to the mixed slurry of the ultrahigh molecular weight polyolefin and the solvent. As the antioxidant, it is particularly preferred to add a polymer-type hindered phenol-based antioxidant, because when the polyolefin porous film is used as the battery separator, the fear of breeding out in respective steps and after produced as the polyolefin porous film is small. Specifically, pentaerythritoltetraquis[3-(3,5-di-t-butyl-4-hydroxyphenyl)propionate] (trade name: Irganox 1010 (registered trade mark) manufactured by Ciba Specially Chemicals Corporation) is preferably used. The antioxidant may be used as a mixture with one or more additional antioxidants.

Then, in the step (b), the kneaded product is molded by extruding it from a die or the like, directly or further through another extruder, to a film thickness of an end product of 5 to 100 μm. As the die, a sheet die having a rectangular die shape is ordinarily used. However, a double-cylindrical inflation die and the like can also be used. The die gap at the time when the sheet die is used is usually from 0.1 to 5 mm, and the extrusion molding temperature is from 140° C. to 250° C. In this case, the extrusion rate is usually from 20 to 30 cm/min or 10 m/min.

The kneaded product thus extruded from the die is cooled, thereby obtaining the gel-like molded product. The cooling is performed at a rate of at least 50° C./min. As a cooling method, there can be used a method of allowing the extruded kneaded product to contact with a cooling roll, a method of allowing the extruded kneaded product to directly contact with cold air, cooling water or another cooling medium, or the like. When the cooling roll is used, the temperature of the cooling roll is set to 80° C. or less, preferably within the range of 20° C. to 50° C. When the temperature exceeds 80° C., it takes time to cool the solution excluded through the die to a state having strength, resulting in the difficulty of handling. The contact with the cooling roll may be assisted with an air knife or the like.

Next, in the step (c), this gel-like molded product is drawn. The drawing is performed by heating the gel-like molded product to 100° C. to 140° C. at a predetermined ratio by a tenter method, a roll method, an inflation method, a rolling method or a combination of these methods, which is ordinarily used. The drawing may be either uniaxial drawing or biaxial drawing, but biaxial drawing is preferred. Further, in the case of biaxial drawing, either longitudinal and transverse biaxial simultaneous drawing or successive drawing may be used. In the viewpoints of uniformity and strength of the polyolefin porous film finally obtained, biaxial simultaneous drawing is more preferred. Further, although the draw ratio varies depending on the thickness of the gel-like molded product, it is preferably 3 times or more in terms of area draw ratio in the biaxial drawing. In view of restriction of facility design, the area draw ratio is more preferably within the range of 5 to 100 times.

After that, in the step (d), the residual solvent in the drawn sheet obtained in the step (c) is removed with a cleaning solvent to obtain the film in which fine pores are formed. As the cleaning solvent, there can be used an easily volatile solvent, for example, a hydrocarbon such as pentane, hexane or heptane, a chlorinated hydrocarbon such as methylene chloride or carbon tetrachloride, a fluorinated hydrocarbon such as ethane trifluoride, or an ether such as diethyl ether or dioxane. These cleaning solvents are appropriately selected depending on the solvent used for the dissolution of the ultrahigh molecular weight polyolefin, and are used either alone or as a mixture thereof. A cleaning method can be performed by a method of immersing the drawn sheet in the cleaning solvent to perform extraction, a method of showering the cleaning solvent, a combined method thereof or the like. The cleaning as described above is performed until the residual solvent in the drawn sheet reaches less than 1% by weight. Thereafter, the cleaning solvent is removed by drying. The cleaning solvent can be removed by a drying method such as drying by heating or air drying. When the drying is performed at a temperature higher than the boiling point of the extraction solvent, it is possible to significantly reduce the residual amount of the solvent. However, when the drying is performed at a temperature of more than 80° C., the polyolefin porous film finally obtained has poor air permeability. It is therefore preferred to suppress the temperature to 80° C. or less. Incidentally, shrinkage of the film occurs in the drying, so that the drying is performed with the film fixed so as not to shrink. At this time, the film is preferably fixed with a tenter so as not to shrink. Further, when the drying temperature is limited to 60° C. or less and the film is drawn in the TD direction within the range of 0% to less than 20%, the drying of the solvent can be promoted without deteriorating the characteristics of the polyolefin porous film finally obtained. This is therefore preferred. Incidentally, when the film is drawn 20% or more in the TD direction at this time, the film is broken in some cases. Accordingly, it is necessary to pay attention to this.

Then, in the step (e), the heat treatment is conducted, while fixing in both directions of the MD and the TD of the film in which fine pores are formed and drawing the above-mentioned film at a draw ratio of exceeding 0% to less than 0.1% in at least one direction of the MD and the TD thereof. Incidentally, in Examples and Table 1 described later, the heat treatment of this step is represented by "heat treatment 1". The heat treatment temperature (temperature in the inside of apparatus) in this heat treatment is arbitrarily adjustable, but it is preferably from 90° C. to 150° C. When the temperature exceeds 150° C., the film cannot maintain the porous structure, sometimes resulting in deterioration of air permeability of the polyolefin porous film finally obtained. When the temperature is less than 90° C., the effect of decreasing the thermal shrinkage ratio of the film is not sufficient, resulting in the failure to obtain the effect of improving dimensional stability of the polyolefin porous film finally obtained. The heat treatment time is also appropriately adjusted by temperature setting. The heat treatment temperature is particularly preferably set to 120° C. to 140° C. Although the heat treatment time is not particularly limited, it is usually from 1 second to 10 minutes, and preferably from 3 seconds to 3 minutes. Crystallization of the ultrahigh molecular weight polyolefin and internal stress relaxation of the film are performed with time by this step. As a result, the dimensional stability of the polyolefin porous film finally obtained is improved.

Incidentally, in the step (e), any of a tenter system, a roll system and a rolling system can be employed. A tenter in which the width of the film can be fixed with chucks is preferred. The temperature of parts themselves of the chucks is preferably lower than the temperature in the step. In respect to construction of the apparatus, the chucks are provided in positions where air circulation is liable to be disturbed, so that in order to reduce the influence thereof, it is preferred to be able to grip the film in small areas as a chuck structure, and to provide many chucks.

When the draw ratio is 0% or less (that is to say, the width is decreased) in this step, the air permeability increases to result in deterioration of the physical properties, although the thermal shrinkage ratio can be decreased. On the other hand, when the draw ratio is 0.1% or more at this time, the polyolefin porous film cannot be finally produced in good yield. The reason for this is deduced to be associated with that when the polyolefin having a weight average molecular weight of 10,000 to less than 500,000 is mixed, it is mixed within the range of 0 to 25 parts by weight based on 100 parts by weight of the ultrahigh molecular weight polyolefin, or that it is better to mix no polyolefin having a weight average molecular weight of 10,000 to less than 500,000, as described above in the invention. In the invention, the ultrahigh molecular weight polyolefin is used alone or at a very high ratio, so that the strength is high. For example, the heat treatment conducted in the above-mentioned patent document 1 and patent document 2 in which the ratio of the ultrahigh molecular weight polyolefin is low is unsuitable. In particular, patent document 2 intends to realize suppression of the thermal shrinkage ratio of the polyolefin porous film by conducting two or more step heat treatment, similarly to the invention, and is characterized in that the first heat treatment is conducted while fixing the film in both directions of the MD and the TD thereof and drawing the film in any one direction of the MD and the TD thereof. However, in patent document 2, the draw ratio in the first heat treatment is specifically described, and it is described that "when the draw ratio is less than 0.1%, a porous film having high tensile strength and puncture strength cannot be obtained". This also supports the above-mentioned deduction.

Next, in the step (f), the heat treatment is conducted while decreasing the width of the film in at least one direction of the MD and the TD of the film. Incidentally, in Examples and Table 1 described later, the heat treatment of this step is represented by "heat treatment 2". In this step, the dimensional stability of the polyolefin porous film finally obtained can be further improved by free shrinkage of the film. The width decrease ratio at this time is preferably within the range of 1 to 10% in at least one direction of the film. When the width decrease ratio is less than 1%, the effect of improving the dimensional stability scarcely appears. On the other hand, when the width decrease ratio is more than 10%, the air permeability or the porosity significantly decreases in some cases.

In the step (f), it is preferred that the temperature is lower than the temperature in the heat treatment apparatus of the step (e) as the first heat treatment. Specifically, the temperature is preferably from 90° C. to 118° C. When the temperature is lower than 90° C., the decrease in width is difficult to proceed, resulting in difficulty obtaining the effect of the dimensional stability. On the other hand, when the temperature is higher than 118° C., the air permeability significantly decreases. Incidentally, mobility of molecules increases as it comes close to the melting point of the resin, and the effect of the dimensional stability can be obtained for a short period of time. It is therefore preferred to set the temperature relatively high within the allowable range.

Incidentally, this step may be performed by a method utilizing, for example, floating or a heating drum. However, a method using an oven in which a roll having a sufficient free running distance (pass line distance) is arranged to an embracing angle of 10° or more is preferred, because free shrinkage is possible and no high-accuracy wind pressure control is required.

Further, in a final stage of the step (e), the film is detached from fixing holding devices (such as the chucks). At this time, shrinkage of the film occurs in some cases. Accordingly, when a production line is constructed by continuously connecting the step (e) to the step (f), the line speed of the step (f) may be a little decreased compared to that of the step (e) (for example, the line speed of the step (f)/the line speed of the step (e) is set to 0.98), within the range not deteriorating the characteristics of the polyolefin porous film finally obtained, thereby decreasing the tension of the film in the MD thereof at an entrance of the apparatus of the step (f).

Furthermore, in this embodiment, a region in which the film is exposed to room temperature may be provided between the step (e) and the step (f). Mutual temperature influence between the step (e) and the step (f) can be eliminated by designing the apparatus as described above.

The polyolefin porous film of the invention obtained by the above-mentioned production method has excellent balance of physical properties, a film thickness of 5 to 100 μm, a porosity of 30 to 50%, an air permeability of 280 sec/100 cc·20 μm or less, a puncture strength of 4,000 mN/20 μm or more, and a thermal shrinkage ratio at 105° C. for 1 hour in both directions of the MD and the TD of 4% or less.

Such a polyolefin porous film is very suitable for lithium battery separators, because of its high air permeability and extremely low thermal shrinkage ratio.

EXAMPLES

The invention will be described in further detail with reference to Examples and Comparative Examples. However, it should be understood that the invention is not restricted only to such Examples. Incidentally, respective properties are measured according to the following methods.

(Weight Average Molecular Weight)

Measurement was made at 135° C. by using a gel permeation chromatograph (GPC-150C) manufactured by Waters Corporation, o-dichlorobenzene as a solvent and Shodex-80M manufactured by Showa Denko K.K. as a column. Data processing was performed by using a data collection system manufactured by TRC. The molecular weight was measured based on polystyrene standards.

(Thickness)

Measurement was made with a 1/10000 thickness gauge.

(Porosity)

The porous film to be measured was cut out into a rectangular shape of 6 cm×4 cm, and the volume and weight thereof were determined. The porosity was calculated from the results obtained, using the following equation:

$$\text{Porosity (vol \%)} = 100 \times (\text{volume (cm}^3) - \text{weight (g)}/\text{average density of resin and inorganic material (g/cm}^3))/\text{volume (cm}^3)$$

(Air Permeability (Gurley Value))

The Gurley value was measured in accordance with JIS P 8117.

(Puncture Strength)

A puncture test was performed by using a compression tester (KES-G5) manufactured by Kato Tech Co., Ltd. The maximum load was read out from a load displacement curve obtained, and taken as the puncture strength. A needle having a diameter of 1.0 mm and a tip curvature radius of 0.5 mm was used, and puncture was performed at a rate of 2 mm/sec.

(Thermal Shrinkage Ratio)

The rectangular sample to be measured, which was stamped out into a shape of 60 mm in the MD and 40 mm in the TD, was held in a high-temperature dryer of 105° C. for 1 hour. After the sample was taken out, the size of the sample in the MD and the TD was measured by using a projector (PJ-A3000, manufactured by Mitutoyo Corporation), and the thermal shrinkage ratio was determined by using the following equation:

$$\text{Thermal shrinkage ratio } (MD) = 100 \times (60 - L1)/60$$

in which L1 is the size (mm) of the sample in the MD after shrinkage.

$$\text{Thermal shrinkage ratio } (TD) = 100 \times (40 - L2)/40$$

in which L2 is the size (mm) of the sample in the TD after shrinkage.

Preferred examples of the invention will be described below by way of example. The examples are performed by using a production apparatus 100 shown in FIG. 1. The production apparatus 100 is provided with a melting unit 11 as a melting section, a twin-screw extruder 12 having a flat die 12a, which acts as a kneading section, cooling rolls 13 as a cool-molding section, a biaxial simultaneous drawing machine 14 as a drawing section, a liquid tank 15 as a solvent-removing section, a tenter 16 as a drying section, a tenter 17 as a first heat treatment section, a heat treatment apparatus 18 as a second heat treatment section and a winding roll 19.

Example 1

First, 15 parts by weight of ultrahigh molecular weight polyethylene (Ticona GUR4012, melting point: 137° C.) having a weight average molecular weight of 1,000,000, 85 parts by weight of liquid paraffin and 0.04 part by weight of an antioxidant (trade name: Irganox 1010 (registered trade mark) manufactured by Ciba Specialty Chemicals Corporation) were homogeneously mixed into a slurry form by using the melting unit 11. Then, the resulting mixture was melt-kneaded in the twin-screw extruder at 170° C. and at a screw rotation speed of 100 rpm. The resulting kneaded product was extruded into a sheet form through the flat die 12a having a lip distance of 2 mm, and the resulting sheet was brought into contact with the cooling rolls (set to 35° C.) 13 while taking off the sheet to cool it, thereby preparing a gel-like molded sheet having a thickness of 1.75 mm. The resulting gel-like molded sheet was drawn by the biaxial simultaneous drawing machine 14 at 126° C. and at a ratio of 5 times in the MD and a ratio of 5 times in the TD (that is to say, the sheet was drawn at an area draw ratio of 5×5=25 times) to obtain a drawn sheet. This drawn sheet was immersed in the liquid tank 15 filled with dichloromethane (boiling point: 40° C.) for 3 minutes to remove liquid paraffin, and dried by the tenter 16 while drawing it 10% in the width direction at a temperature of 50° C. The resulting film was heat treated by the tenter 17 having an inside temperature of 130° C. for 2 minutes while drawing it 0.05% in the TD (this step is hereinafter referred to as "heat treatment 1" for the sake of convenience). Subsequently, the film was allowed to pass through the heat treatment apparatus 18 having an inside temperature of 110° C. at a speed of 1.0 times based on that in the tenter 17 of 130° C., thereby decreasing the width 3.5% in the TD by free shrinkage (this step is hereinafter referred to as "heat treatment 2" for the sake of convenience), and winded by the winding roll 19 to obtain a polyolefin porous film. The evaluation results of the physical properties of the resulting polyolefin porous film are shown in Table 1.

Example 2

A polyolefin porous film was obtained under the same conditions as in Example 1 with the exception that the film was allowed to pass through the heat treatment apparatus 18 of heat treatment 2 at a speed of 0.98 times based on that in the tenter 17 of 130° C. The evaluation results of the physical properties of the resulting polyolefin porous film are shown in Table 1.

Example 3

A polyolefin porous film was obtained under the same conditions as in Example 2 with the exceptions that the sheet having a thickness of 0.90 mm was prepared, and that this sheet was drawn by the biaxial simultaneous drawing machine 14 at 124° C. The evaluation results of the physical properties of the resulting polyolefin porous film are shown in Table 1.

Example 4

A polyolefin porous film was obtained under the same conditions as in Example 2 with the exceptions that the set temperature of the cooling rolls 13 was changed to 40° C., that the inside temperature in the tenter 17 of heat treatment 1 was changed to 126° C., that the inside temperature in the tenter 18 of heat treatment 2 was changed to 115° C., and that the decrease in width in the TD was changed to 5%. The evaluation results of the physical properties of the resulting polyolefin porous film are shown in Table 1.

Example 5

A polyolefin porous film was obtained under the same conditions as in Example 2 with the exceptions that the temperature was changed to 115° C. in the heat treatment apparatus 18 of heat treatment 2, and that the decrease in width in the TD was changed to 5%. The evaluation results of the physical properties of the resulting polyolefin porous film are shown in Table 1.

Comparative Example 1

A polyolefin porous film was obtained under the same conditions as in Example 1 with the exception that the film was heat treated by the tenter 17 of heat treatment 1 for 2 minutes while decreasing the width 3.00% in the TD. The evaluation results of the physical properties of the resulting polyolefin porous film are shown in Table 1.

Comparative Example 2

A polyolefin porous film was obtained under the same conditions as in Example 1 with the exception that the film was heat treated by the tenter 17 of heat treatment 1 for 2 minutes while drawing it 1.00% in the TD. The evaluation results of the physical properties of the resulting polyolefin porous film are shown in Table 1.

TABLE 1

|  |  | Example 1 | Comparative Example 1 | Comparative Example 2 | Example 2 |
|---|---|---|---|---|---|
| Ultrahigh Molecular Weight Polyethylene | Molecular Weight (Mw) | 1,000,000 | 1,000,000 | 1,000,000 | 1,000,000 |
|  | Content (wt %) | 15 | 15 | 15 | 15 |
| Paraffin Oil | Viscosity @ 40° C. | 52 mm$^2$/s | 52 mm$^2$/s | 52 mm$^2$/s | 52 mm$^2$/s |
|  | Content (wt %) | 85 | 85 | 85 | 85 |
| Extrusion Conditions | Apparatus | Twin-screw extruder | Twin-screw extruder | Twin-screw extruder | Twin-screw extruder |
|  | Rotation Speed | 100 rpm | 100 rpm | 100 rpm | 100 rpm |
|  | Control Temperature | 170° C. | 170° C. | 170° C. | 170° C. |
|  | Die Control Temp. | 170° C. | 170° C. | 170° C. | 170° C. |
| Cooling Conditions | Temperature | 35° C. | 35° C. | 35° C. | 35° C. |
|  | Sheet Thickness | 1.75 mm | 1.75 mm | 1.75 mm | 1.75 mm |
| Drawing Conditions | Temperature | 126° C. | 126° C. | 126° C. | 126° C. |
|  | Ratio | 5 × 5 | 5 × 5 | 5 × 5 | 5 × 5 |
| Extraction Conditions | Solvent Used | Dichloromethane | Dichloromethane | Dichloromethane | Dichloromethane |
|  | Extraction Time | 3 min | 3 min | 3 min | 3 min |
| Drying Conditions | System | Tenter | Tenter | Tenter | Tenter |
|  | Temperature | 50° C. | 50° C. | 50° C. | 50° C. |
| Conditions of Heat Treatment 1 | System | Tenter | Tenter | Tenter | Tenter |
|  | Inside Temperature | 130° C. | 130° C. | 130° C. | 130° C. |
|  | Width Draw Ratio* | 0.05% | −3.00% | 1.00% | 0.05% |
| Conditions of Heat Treatment 2 | Inside Temperature | 110° C. | 110° C. | 110° C. | 110° C. |
|  | Width Draw Ratio* | −3.5% | −3.5% | −3.5% | −3.5% |
|  | Line Speed Ratio to Heat Treatment 1 | 1 | 1 | 1 | 0.98 |
|  | Appearance | Good | Good | Holes were formed in chuck portions | Good |
|  | Thickness (μm) | 20 | 20 | 20 | 20.5 |
|  | Porosity (%) | 41 | 38 | 40 | 41 |
|  | Air Permeability (sec) | 250 | 290 | 260 | 240 |
|  | Puncture Strength (mN) | 5050 | 5100 | 5050 | 5100 |
| Thermal shrinkage ratio# | MD (%) | 2.5 | 2.4 | 2.5 | 2.3 |
|  | TD (%) | 0 | −0.3 | −0.1 | −0.2 |

|  |  | Example 3 | Example 4 | Example 5 |
|---|---|---|---|---|
| Ultrahigh Molecular Weight Polyethylene | Molecular Weight (Mw) | 1,000,000 | 1,000,000 | 1,000,000 |
|  | Content (wt %) | 15 | 15 | 15 |
| Paraffin Oil | Viscosity @ 40° C. | 52 mm$^2$/s | 52 mm$^2$/s | 52 mm$^2$/s |
|  | Content (wt %) | 85 | 85 | 85 |
| Extrusion Conditions | Apparatus | Twin-screw extruder | Twin-screw extruder | Twin-screw extruder |
|  | Rotation Speed | 100 rpm | 100 rpm | 100 rpm |
|  | Control Temperature | 170° C. | 170° C. | 170° C. |
|  | Die Control Temp. | 170° C. | 170° C. | 170° C. |
| Cooling Conditions | Temperature | 35° C. | 40° C. | 35° C. |
|  | Sheet Thickness | 0.90 mm | 1.75 mm | 1.75 mm |
| Drawing Conditions | Temperature | 124° C. | 126° C. | 126° C. |
|  | Ratio | 5 × 5 | 5 × 5 | 5 × 5 |
| Extraction Conditions | Solvent Used | Dichloromethane | Dichloromethane | Dichloromethane |
|  | Extraction Time | 3 min | 3 min | 3 min |
| Drying Conditions | System | Tenter | Tenter | Tenter |
|  | Temperature | 50° C. | 50° C. | 50° C. |
| Conditions of Heat Treatment 1 | System | Tenter | Tenter | Tenter |
|  | Inside Temperature | 130° C. | 126° C. | 130° C. |
|  | Width Draw Ratio* | 0.05% | 0.05% | 0.05% |

TABLE 1-continued

| Conditions of Heat Treatment 2 | Inside Temperature | 110° C. | 115° C. | 115° C. |
|---|---|---|---|---|
| | Width Draw Ratio* | −3% | −5% | −5% |
| | Line Speed Ratio to Heat Treatment 1 | 0.98 | 0.98 | 0.98 |
| | Appearance | Good | Good | Good |
| | Thickness (μm) | 10.5 | 21.5 | 20.5 |
| | Porosity (%) | 39 | 44 | 39 |
| | Air Permeability (sec) | 135 | 230 | 260 |
| | Puncture Strength (mN) | 2950 | 5150 | 5000 |
| Thermal shrinkage ratio# | MD (%) | 3.4 | 3.3 | 2.5 |
| | TD (%) | −0.7 | 0.3 | −0.5 |

*The minus value shows the decease in width.
The minus value shows extension.

When the polyolefin porous film is incorporated in a battery as a separator, lithium ions migrate through pores of the separator. In a high-power battery, it is therefore required to decrease the resistance of the separator as much as possible. Accordingly, the separator is required to have high porosity and air permeability.

On the other hand, the high-power battery is also required to have safety, and the thermal shrinkage of the separator which becomes one cause for short circuit is also required to be suppressed as much as possible.

By comparison of Examples 1 to 5 with Comparative Example 1, there is not so much difference therebetween in the thermal shrinkage ratio of the polyolefin porous film finally obtained, and the porosity and the air permeability of the file of Examples 1 to 5 are improved. This shows that the production method of the invention is present within a specific area so that the preferred characteristics can be obtained.

Further, as shown in Comparative Example 2, when the film is largely drawn in the TD in heat treatment 1, the film is broken in the vicinities of the chucks. The tenter of heat treatment 1 is provided with many chucks for holding the film by pinching, and tension which is generated in the film is locally concentrated to the vicinities of the chucks, thereby being liable to form holes. When such holes are formed, the film locally freely shrinks under the heating conditions of heat treatment 1, and uniformity of the physical properties of the film significantly deteriorates in the vicinities of the chucks. Accordingly, the production yield of the polyolefin porous film decreases.

Incidentally, the invention should not be construed as being limited to those shown in the above-mentioned embodiments, and variations and modifications made by those skilled in the art based on the description of the specification and well-known technique are acceptable to the invention and are contained in a scope within which protection is sought.

While the invention has been described in detail with reference to specific embodiments thereof, it will be apparent to one skilled in the art that various changes and modifications can be made therein without departing from the spirit and scope thereof.

Incidentally, the present application is based on Japanese Patent Applications No. 2010-176807 filed on Aug. 5, 2010 and No. 2010-293506 filed on Dec. 28, 2010, and the contents are incorporated herein by reference.

All references cited herein are incorporated by reference herein in their entirety.

Also, all the references cited herein are incorporated as a whole.

The production method of the invention can be utilized for providing battery separators, particularly lithium battery separators having high heat generation, and can be suitably utilized in the case of obtaining separators contributing to high battery characteristics and safety of lithium batteries. The polyolefin porous film obtained by the production method of the invention is more excellent as the battery separator than the conventional porous film, and has high performance.

DESCRIPTION OF REFERENCE NUMERALS AND SIGNS

11: Melting unit
12: Twin-screw extruder
12a: Flat die
13: Cooling rolls
14: Biaxial simultaneous drawing machine
15: Liquid tank
16, 17: Tenters
18: Heat treatment apparatus
19: Winding roll
100: Production apparatus

What is claimed is:

1. A method for producing a polyolefin porous film, said method comprising the steps of:
   (a) melt-kneading a solution consisting of an ultrahigh molecular weight polyethylene having a weight average molecular weight of 500,000 or more, a solvent and an antioxidant to obtain a kneaded product;
   (b) extruding and cooling the kneaded product to obtain a gel molded product;
   (c) drawing the gel molded product to obtain a drawn sheet;
   (d) removing the solvent from the drawn sheet, followed by drying to obtain a film in which fine pores are formed;
   (e) conducting heat treatment, while fixing the film in both directions of a MD and a TD thereof and drawing the film at a draw ratio of exceeding 0% up to 0.05% in at least one direction of the MD and the TD thereof; and
   (f) conducting heat treatment while decreasing a width of the film in at least one direction of the MD and the TD of the film,
   wherein the polyolefin porous film has an air permeability of 280 sec/100 cc·20 μm or less.

2. The method for producing a polyolefin porous film according to claim 1, wherein the solution substantially consists of ultrahigh molecular weight polyethylene having a weight average molecular weight of 500,000 or more and the solvent.

3. The method for producing a polyolefin porous film according to claim 1, wherein a polymer-type hindered phenol-based antioxidant is added to the solvent in the step (a).

* * * * *